United States Patent [19]

Yamashita et al.

[11] Patent Number: 4,885,350

[45] Date of Patent: Dec. 5, 1989

[54] METHOD OF PRODUCING POLYMER PARTICLES HAVING NARROW PARTICLE SIZE DISTRIBUTION

[75] Inventors: Hiroshi Yamashita, Shizuoka; Kenkichi Muto, Kanagawa, both of Japan

[73] Assignee: Ricoh Company, Ltd., Tokyo, Japan

[21] Appl. No.: 89,036

[22] Filed: Aug. 24, 1987

Related U.S. Application Data

[63] Continuation of Ser. No. 752,591, Jul. 8, 1985, abandoned.

[30] Foreign Application Priority Data

Jul. 6, 1984 [JP] Japan .................................. 59-139115

[51] Int. Cl.$^4$ ............................................... C08F 2/14
[52] U.S. Cl. ..................... 526/201; 526/200; 526/209; 526/203; 526/204; 526/212; 526/217; 526/909
[58] Field of Search ............... 526/204, 209, 200, 201, 526/203, 212, 217, 340, 342, 346, 347

[56] References Cited

U.S. PATENT DOCUMENTS 3,232,912  2/1966  Munday ............................. 526/201
4,029,616  6/1977  Nakashio ........................... 524/732
4,334,049  6/1982  Ramlow ............................. 526/202

FOREIGN PATENT DOCUMENTS 778035  7/1957  United Kingdom .

Primary Examiner—Christopher Henderson
Attorney, Agent, or Firm—Oblon, Spivak, McClelland, Maier & Neustadt

[57] ABSTRACT

A method of producing polymer particles having a particle size distribution of ±25% with respect to each average particle size in an amount of 95 wt. % or more, within the average particle sizes ranging from 1 μm to 100 μm, is disclosed, which comprises the steps of: (1) adding a polymer dispersion stabilizer in an amount of 0.1 to 10 wt. % to a hydrophilic organic liquid in which the polymeric dispersion stabilizer is soluble; (2) adding thereto at least one vinyl monomer in an amount of not more than 50 times by weight the amount of the polymeric dispersion stabilizer, which monomer is soluble in the hydrophilic organic liquid, but a polymer synthesized from the monomer being swelled or substantially insoluble in the hydrophilic organic liquid; and (3) polymerizing the monomer under the condition that the amount of the vinyl monomer is 200 wt. % or less of the hydrophilic organic liquid.

1 Claim, No Drawings

METHOD OF PRODUCING POLYMER PARTICLES HAVING NARROW PARTICLE SIZE DISTRIBUTION

This application is a continuation of application Ser. No. 752,591 filed on July 8, 1985, now abandoned.

BACKGROUND OF THE INVENTION

The present invention relates to a method of producing polymer particles having a narrow particle size distribution, and more particularly to a method of producing polymer particles having a particle size distribution of ±25% with respect to each average particle size in an amount of 95 wt. % or more, within the average particle sizes ranging from 1 $\mu$m to 100 $\mu$m, which method can be utilized, for instance, as spacers employed in liquid crystal display and wet-type developers and dry-type developers for developing latent electrostatic images; as micro spherical lens for optical fiber, optical branch circuit, optical junction circuit, optical multi-channel, optical switch, optical modulator, and optical connector device; as condenser lens for light emission diode; as surface active microsphere for detection of antigens and antibodies; and as fillers for gas-liquid chromatography.

Conventionally, a variety of studies have been conducted on the methods of producing polymer particles having narrow particle size distributions and in fact a number of patent applications have been filed in connection with the production of such polymer particles.

For instance, the suspension polymerization method has been proposed. In this method, liquid particles of a vinyl monomer are formed in water in the presence of an appropriate dispersion stabilizer, and the dispersed vinyl monomer is polymerized by use of an oil-soluble polymerization initiator. In this method, when the polymerization is carried out under normal stirring conditions, the produced polymer adheres to the wall of the reactor and to the blades of the stirrer, so that the polymer particles become as large as several hundred microns to several millimeters in particle size and the particle distribution becomes very broad, because the particle distribution is predominantly controlled by the factor of the probability of separation and combination of the liquid particles formed in the course of polymerization.

In order to obtain polymer particles with a narrow particle size distribution as the countermeasure, several methods have been proposed, for instance, a method of performing bulk polymerization, followed by the suspension polymerization, a method of partly dissolving a polymer in a monomer to provide the dispersion liquid with an appropriate viscosity, followed by the above suspension polymerization, and suspension polymerization methods using a variety of suspension stabilizers having the property of strong surface activity, using finely-divided inorganic particles which are slightly dissolved in water, or using such suspension stabilizers and inorganic particles in combination. These methods, however, are capable of slightly improving the particle size distribution and still yield polymer particles having a broad particle size distribution.

As a method of obtaining polymer particles having small particle sizes, there is known a micro suspension polymerization method. This method utilizes the principle that liquid particles of polymerizable monomers are stabilized in the presence of a suspension stabilizer with high concentration, and polymerization is performed under the conditions that the liquid particles neither separate nor become united. Therefore, when obtaining polymer particles having a narrow particle size distribution, dispersion of the polymerizable monomer in an aqueous medium before initiation of polymerization is always a problem. For that dispersion, mechanical and physical dispersion devices have been proposed, such as a homomixer, a homogenizer, an atomizer, a one-liquid fluid nozzle, a gas-liquid fluid nozzle and an electric emulsifier. These devices are capable of dispersing the polymerizable monomer in the form of finely-divided liquid particles. However, the necessary conditions for obtaining a uniform particle size distribution are so delicate that it is substantially impossible to obtain polymer particles having a narrow particle size distribution. Particularly, in this method, polymerization also takes place in the aqueous phase, since a suspension stabilizer is employed with a relatively high concentration, so that polymer particles having extremely small particle sizes, for instance, particles with a particle size ranging from 0.1 micron to 1 micron are formed and this becomes a problem.

As another method of obtaining polymer particle having small particle sizes, there is known the so-called emulsion polymerization. In this method, since polymerization proceeds through micelles, each polymer particle uniformly grows, so that a dispersion of polymer particles with a highly uniform particle size distribution can be obtained under appropriate polymerization conditions. However, the particle size of the polymer particles produced by this method is so small, for instance, ranging from 0.1 micron to 1 micron, that, in order to obtain polymer particles having particle sizes of several microns, it is necessary to employ the seed emulsion polymerization in which the above-mentioned small polymer particles are used as seeds or core particles and the polymerizable monomer is added thereto in a system in which further formation of the small polymer particles is prohibited, so that each seed is caused to grow. However, these seeds do not grow significantly, so that it is necessary to repeat the above step several times in order to obtain larger polymer particles. Therefore this method has the drawbacks that it is costly and the polymerization process is long.

Japanese Patent Publication No. 57-24369 discloses an improved seed emulsion polymerization in which the seed polymer particles are caused to swell in two steps, thereby increasing the monomer absorption efficiency of the seed particles. Unquestionably, this method is capable of yielding relatively large polymer particles having a uniform particle size distribution. However, the polymerization process is not only complicated, but the polymerization step and the swelling step are also extremely time-consuming, and it is considerably difficult to set up appropriate conditions for polymerization.

As still another conventional method of obtaining polymer particles having small particle sizes, there is known the so-called dispersion polymerization in organic liquid. In this method, polymerization is performed in a system in which a polymerizable monomer is soluble, but the produced polymer is insoluble and separates out. When polymerization is performed in such a system, an adhesive material, a glassy material or a bulky material is formed during or at the end of polymerization, so that it is impossible to obtain a stable polymer dispersion or polymer particles. However, by use of a block copolymer or a graft copolymer in an organic liquid (in which the produced polymer is insoluble) as a dispersion stabilizer, one component of which copolymer is dissoluble in the organic liquid and the other component of which copolymer is soluble in the produced polymer, a stable polymer particle dispersion can be obtained, so that polymer particles can be recovered.

As the organic liquid in which the produced polymer is insoluble, non-polar solvents, for example, aliphatic hydrocarbons, and polar solvents, for example, alcohols having a small number of carbon atoms, can be employed.

Inventions directed to the production of stable dispersions of polymers in organic liquids, in particular, in aliphatic hydrocarbons, are disclosed in a number of Japanese Patent Publications Nos. 46-16887, No. 46-38246, No. 46-40685 and No. 47-296. Inventions directed to the production of polymers in polar solvents are disclosed, for instance, in Japanese Patent Publications No. 54-2238 and No. 57-46445. All of these inventions are directed to the methods of producing stable polymer dispersions in organic liquids, with the desired particle size being in the range of 1 μm or less, without any particular necessity for controlling the particle size distribution.

SUMMARY OF THE INVENTION

It is therefore an object of the present invention to provide a method of producing polymer particles having a narrow particle size distribution, which method is simple in the reaction process and suitable for industrial use.

According to the present invention, this object can be achieved by the method comprising the steps of (1) adding a polymeric dispersion stabilizer in an amount ranging from 0.1 to 10 wt. % to a hydrophilic organic liquid in which the polymeric dispersion stabilizer is soluble, (2) adding thereto at least one vinyl monomer in an amount of not more than 50 times by weight the amount of the polymeric dispersion stabilizer, which vinyl monomer is soluble in the hydrophilic organic liquid, but a polymer synthesized from the monomer being swelled or substantially insoluble in the hydrophilic organic liquid; and (3) polymerizing the monomer in the presence of a polymerization initiator, under the condition that the amount of the vinyl monomer does not exceed 200 wt. % of the hydrophilic organic liquid, whereby, within the average particle sizes ranging from 1 μm to 100 μm, polymer particles having a particle size distribution of ±25% with respect to each average particle size can be obtained in an amount of 95 wt. % or more.

DETAILED DESCRIPTION OF THE PREFERRED EMBODIMENTS

Examples of the hydrophilic organic liquids for use in the present invention are as follows: Alcohols, such as methyl alcohol, ethyl alcohol, modified ethyl alcohol, isopropyl alcohol, n-butyl alcohol, isobutyl alcohol, tert-butyl alcohol, sec-butyl alcohol, tert-amyl alcohol, 3-pentanol, octyl alcohol, benzyl alcohol, cyclohexanol, furfuryl alcohol, tetrahydrofurfuryl alcohol, ethylene glycol, glycerol and diethylene glycol; and ether alcohols, such as methyl cellosolve, cellosolve, butyl cellosolve, isopropyl cellosolve, butyl cellosolve, ethylene glycol monomethyl ether, ethylene glycol monoethyl ether, diethylene glycol monomethyl ether and diethylene glycol monoethyl ether.

These organic liquids can be used alone or in combination.

The average particle size and particle size distribution of the polymer particles to be produced can be adjusted by changing the solubility parameters under the condition that the produced polymer is insoluble in the organic liquids, by addition thereto organic liquids other than the above alcohols and ether alcohols.

Examples of the organic liquids to be used in combination with the above alcohols and ether alcohols are as follows: Hydrocarbons such as hexane, octane, petroleum ether, cyclohexane, benzene, toluene and xylene; halogenated hydrocarbons such as carbon tetrachloride, trichloroethylene and tetrabromoethane; ethers such as ethyl ether, dimethyl glycol, trioxymethylene and tetrahydrofuran; acetals such as methylal and diethy acetal; ketones such as acetone, methyl ethyl ketone, methyl isobutyl ketone and cyclohexane; esters such as butyl formate, butyl acetate, ethyl propionate and cellosolve acetate; acids such as formic acid, acetic acid and propionic acid; sulfur-containing and nitrogen-containing organic compounds such as 2-nitro-1-propylene, nitrobenzene, dimethylamine, monethanolamine, pyridine, dimethyl sulfoxide and dimethylformamide; and water.

Polymerization can also be performed in the organic liquids consisting essentially of one of the above organic liquids in the presence of an inorganic ion such as $SO_4^{2-}$, $NO^{2-}$, $PO_4^{3-}$, $Cl^-$, $Na^+$, $K^+$, $Mg^{2+}$ and $Ca^{2+}$.

The average particle size and particle size distribution of the polymer particles to be produced and the drying conditions for the polymer particles can also be adjusted by changing the kinds of the mixed solvents and the composition thereof at the initiation, in the course and at the termination of polymerization.

Appropriate examples of polymeric dispersion stabilizers for use in the present invention are as follows: Homopolymers and copolymers of acids, such as acrylic acid, methacrylic acid, α-cyanoacrylic acid, α-cyanonmethacrylic acid, itaconic acid, crotonic acid, fumaric acid, maleic acid and maleic anhydride; acrylic mononers containing hydroxyl group, such as acrylic acid β-hyroxyethyl, methacrylic acid β-hydroxyethyl, acrylic acid β-hydroxypropyl, methacrylic acid β-hydroxypropyl, acrylic acid β-hydroxypropyl, methacrylic acid γ-hydroxypropyl, acrylic acid 3-chloro-2-hydroxypropyl, methacrylic acid 3-chloro-2-hydroxypropyl, diethylene glycol monoacrylic acid ester, diethylene glycol monomethacrylic acid ester, glycerol monoacrylic acid ester, glycerol monomethacrylic acid ester, N-methylolacrylamide and N-methylol-methacrylamide; vinyl alcohols and ethers of vinyl alcohols, such as vinylmethyl ether, vinylethyl ether and vinylpropyl ether; esters of compounds containing vinyl alcohols and carboxyl group, such as vinyl acetate, vinyl propionate and vinyl butyrate; acrylic amide, methacrylic amide, diacetone acrylic amide, and methylol derivatives of these compounds, acid chlorides such as acrylic acid chloride and methacrylic acid chloride; homopolymer and copolymers of compounds containing nitrogen atoms or heterocyclic rings, such as vinylpyridine, vinylpyrrolidone, N-vinylimidazole and ethyleneimine; polyoxyethylenic compounds such as polyoxyethylene, polyoxypropylene, polyoxyethylene alkylamine, polyoxyethylene alkylamide, polyoxypropylene alkylamide, polyoxyethylene nonyl phenyl ether, polyoxyethylene lauryl phenyl ether, polyoxyethylene stearylphenylester and polyoxyethylene nonylphenyl ester; celluloses such as methylcellulose, hydroxyethylcellulose and hydroxypropylcellulose; copolymers of the above hydrophilic monomers and (i) benzene-ring-containing monomers and their derivatives such as styrene, α-methylstyrene and vinyltoluene and their derivatives, (ii) acrylic acid derivatives and methacrylic acid derivatives such as acrylonitrile, methacrylonitrile and acrylic amide, and (iii) monomers which are capable of cross-linking, such as ethyleneglycol dimethacrylate, diethylene glycol dimethacrylate, arylmetharylate and divinylbenzene.

Appropriate polymeric dispersion stabilizers can be chosen from the above stabilizers, with the employed hydrophilic organic liquid and the kind of the desired polymer particles taken into consideration.

In order to sterically prevent reunion of the produced toner particles, it is preferable to employ polymeric dispersion stabilizers which have a strong affinity for the produced polymer particles, firmly adhere to the surface of the polymer particles, also have a strong affinity for the hydrophilic organic liquid and are highly soluble in the hydrophilic organic liquid.

Furthermore, in order to increase the steric repulsion between the produced polymer particles, it is preferable to use as the stabilizer polymers having an appropriate chain length, for instance, polymers having a molecular weight of 10,000 or more. However, when the molecular weight of the polymeric stabilizer is much higher than that, the viscosity of the dispersion becomes so high that the operation for polymerization, for instance, stirring, becomes difficult and the stabilizer does not uniformly deposit at the surface of the produced polymer particles.

When polymerization for preparing the polymer particles is performed, it is effective to use in combination with the dispersion stabilizer the monomer of which the polymeric dispersion stabilizer is composed.

Further in combination with the polymeric dispersion stabilizer, the following can be employed: finely-divided metal and alloy particles (preferably with a particle size of 1 μm or less) of, for instance, cobalt, iron, nickel, aluminum, copper, tin, lead and magnesium; oxide powders of, for instance, iron oxide, copper oxide, nickel oxide, zinc oxide, titanium oxide and silicon oxide; pigments and dyes, such as carbon black, Nigrosine, Aniline Blue, Chrome Yellow, Phthalocyanine Blue, and Rose Bengale; negative ion surface active agents such as higher alcohol sulfuric acid ester salts, alkylbenzene sulfonic acid salts, α-olefine sulfonic acid salts and phosphoric acid esters; positive ion surface active agents of amine salt type such as alkylamine salts, aminoalcohol fatty acid derivatives, polyamine fatty acid derivatives and imidazoline; positive ion surface active agents of quaternary ammonium salt type such as alkyltrimethylammonium salt, dialkyldimethylammonium salt, alkyldimethylbenzylammonium salt, pyridinium salt, alkyl isoquinolinium salt and benzethonium chloride; and non-ionic surface active agents such as fatty acid amide derivatives and polyhydric alcohol derivatives.

The stabilization and the particle size distribution of the produced polymer particles can be further improved by use of (i) amino acid type amphoteric surface active agents, for instance, alanine type amphoteric surface active agents (for example, alkylaminopropionic acid) and glycine type amphoteric surface active agents (for example, dodecyl di(aminoethyl) glycine and di(octylaminoethyl) glycine) and (ii) betaine type amphoteric surface active agents.

The amount of the polymeric dispersion stabilizer to be employed is different depending upon the kind of the monomers for preparation of the polymer particles. Generally it is preferable to use the polymeric dispersion stabilizers in an amount ranging from 0.1 wt. % to 10 wt. %, more preferably in an amount ranging from 1 wt. % to 5 wt. %, with respect to the hydrophilic organic liquid. When the concentration of the polymeric dispersion stabilizer is low, polymer particles having comparatively large particle sizes can be obtained, while when the concentration of the polymeric dispersion stabilizer is high, polymer particles having small particle sizes can be obtained, but even if the concentration is increased beyond 10 wt. %, the particle size cannot be decreased significantly.

The polymer particles produced are stabilized in the hydrophilic organic liquid by the polymeric dispersion stabilizer which is distributed at the surface of the polymer particles in equilibrium with the hydrophilic organic liquid. The particle size distribution of the polymer particles produced has a close relationship with the amounts of the polymeric dispersion stabilizer and the vinyl monomer.

The vinyl monomers for use in the present invention are soluble in the previously mentioned hydrophilic organic liquids, but polymers synthesized from the vinyl monomers are substantially insoluble in the hydrophilic organic liquids or may swell in the hydrophilic organic liquids.

It is preferable that the amount of the monomer be 50 times or less by weight, more preferably 20 times or less by weight, the amount of the polymeric dispersion stabilizer, in order to obtain polymer particles having a narrow particle size distribution.

The vinyl monomers for use in the present invention are soluble in hydrophilic organic liquids and it is preferable that the amount of the vinyl monomers be 200 wt. % or less, more preferably 100 wt. % or less, with respect to the hydrophilic organic solvent.

Examples of such vinyl monomer are (i) the following monomers, (ii) mixtures of the following monomers and (iii) mixtures consisting of at least 50 wt. % of the following monomers and monomers other than the following monomers, which monomers are capable of forming copolymer with the following monomers: styrene and styrene derivatives, such as o-methylstyrene, m-methylstyrene, p-methylstyrene, α-methylstyrene, p-ethylstyrene, 2,4-dimethylstyrene, p-n-butylstyrene, p-tert-butylstyrene, p-n-hexylstyrene, p-n-octylstyrene, p-n-nonylstyrene, p-n-decylstyrene, p-n-dodecylstyrene, p-methoxystyrene, p-phenylstyrene, p-chlorostyrene and 3,4-dichlorostyrene; α-methylene aliphatic monocarboxylic acid esters, such as methyl acrylate, ethyl acrylate, n-butyl acrylate, isobutyl acrylate, propyl acrylate, n-octyl acrylate, dodecyl acrylate, lauryl acrylate, 2-ethylhexyl acrylate, stearyl acrylate, 2-chloroethyl acrylate, phenyl acrylate, methyl α-chloroacylate, methyl methacryate, ethyl methacrylate, propyl methacrylate, n-butyl methacrylate, isobutyl methacrylate, n-octyl methacrylate, dodecyl methacrylate, lauryl methacrylate, 2-ethylhexyl methacrylate, stearyl methacrylate, phenyl methacrylate, dimethylaminoethyl methacrylate and diethyl-aminoethyl methacrylate; acrylic acid derivatives and methacrylic acid derivatives such as acrylonitrile, methacrylonitrile and acrylamide; and halogenated vinyl compounds such as vinyl chloride, vinylidene chloride, vinyl bromide and vinyl fluoride.

As the polymers prepared according to the present invention, there can be cross-linked polymers which are polymerized in the presence of the so-called cross linking agents including two or more polymerizable double bonds.

Examples of the cross linking agents preferably employed in the present invention are as follows: Aromatic divinyl compounds such as divinylbenzene, divinylnaphthalene and derivatives thereof; diethylenic carboxylic acid esters such as ethylene glycol dimethacrylate, diethylene glycol methacrylate, triethylene glycol methacrylate, trimethylolpropane triacrylate, allyl methacrylate, tert-butylaminoethyl methacrylate, tetraethylene glycol dimethacrylate and 1,3-butane-diol dimethacrylate; other divinyl compounds such as N, N-divinyl aniline, divinyl ether, divinyl sulfide, and divinyl sulfone; and compounds having 3 or more vinyl groups. These vinyl compounds can be employed alone and in combination.

As the polymerization initiators for use in the present invention, for example, the following can be employed: Azo type initiators such as 2,2'-azobisisobutyronitrile and 2,2'-azobis(2,4-dimethylvaleronitrile); peroxide type initiators such as lauroyl peroxide, benzoyl peroxide and tert-butyl peroctoate; persulfide type initiators such as potassium persulfate; and persulfide type initiators in combination with, for example, sodium thiosulfate and amines.

It is preferable that the concentration of the polymerization initiators be in the range of 0.1 to 10 parts by weight to 100 parts by weight of the vinyl monomer.

Generally the conditions for polymerization, for instance, the concentrations of the polymeric dispersion stabilizer and vinyl monomer and the distribution ratio of the two in the hydrophilic organic liquid, are determined in accordance with the desired average particle size and particle size distribution.

As mentioned previously, when decreasing the average particle size, the concentration of the polymeric dispersion stabilizer is increased, while when increasing the average particle size, the concentration of the polymeric dispersion stabilizer is decreased.

When making the particle size distribution narrower or sharper, the concentration of the vinyl monomer is decreased. When it is not necessary to obtain a sharp particle size distribution, the concentration of the vinyl monomer is set high. Generally, when the amount of the monomer by weight exceeds 200 times the amount of the hydrophilic organic liquid, it is difficult to obtain polymer particles having a particle size distribution of 25% with respect to each average particle size within the range of the average particle size of 1 $\mu$m to 100 $\mu$m, in an amount of 95 wt. % or more.

In the present invention, polymerization is performed by the following steps: A polymeric dispersion stabilizer is completely dissolved in a hydrophilic organic liquid. To this solution, one or more vinyl monomers, a polymerization initiator, when necessary, finely-divided inorganic particles, a surface active agent, a dye or a pigment, are added and the mixture is stirred at 50 to 300 rpm under application of heat thereto, preferably under an inert atmosphere by passing an inert gas therethrough.

In order to perform polymerization for obtaining polymer particles with relatively high polymerization degree, 5 to 40 hours are necessary for polymerization.

Depending upon the desired particle size and particle size distribution, the polymerization can be stopped or a polymerization initiator can be successively added to increase the polymerization rate.

Further, the physical and mechanical properties, the average particle size and the particle size distribution of the polymer particles to be produced can be adjusted as desired by addition of the same monomer or other monomer periodically in the course of polymerization or after the termination of the polymerization.

For instance, by periodical addition of different types of vinyl monomers or by periodical addition of vinyl monomers with different mixing ratios in the course of polymerization, polymer particles, with the physical properties of each particle changing from the inside to the outside thereof, can be synthesized. Further, when a dye or a pigment is present at the interface of each polymer particle and the monomers, the polymer particles can be colored and such coloring agents can be fixed to the polymer particles.

If a monomer is further polymerized at the surface of the polymer particles under appropriate conditions after the completion of the polymer particles, the first prepared polymer particles act as core particles for the second polymerization, so that those particles grow in the course of the second polymerization. The monomer for the second polymerization can be the same as or different from the monomer for the first prepared polymer particles. When a different monomer is employed for the second polymerization, polymer particles can be coated with a different polymer layer.

After the completion of all the polymerization steps, a slurry of the produced polymer particles can be separated, for instance, by sedimentation, centrifugation or decantation. Thereafter, the slurry is washed, filtered off, or subjected to spray drying, whereby polymer particles with a uniform particle size distribution can be obtained in the form of powder.

By referring to the following examples, the present invention will now be explained in more detail:

EXAMPLE 1

In a 500 ml three-necked flask fitted with a stirrer and a reflux condenser was placed 320 g of methanol (dried through a molecular sieve 5A). To the methanol was added gradually, with stirring, 6.4 g of polyvinyl pyrrolidone (average M.W. 40,000), so that the polyvinyl pyrrolidone was completely dissolved in the methanol. To this solution, 32 g of styrene and 0.2 g of 2,2'-azobisisobutyronitrile were added and completely dissolved, so that the mixture became a clear solution. The flask was purged with a dry argon gas, with stirring, and the reaction mixture was continuously stirred for one hour, with a small amount of the dry argon gas slowly passed therethrough.

Polymerization was initiated with stirring at 200 rpm. with the flask placed in a hot water bath thermostated at 60° C.±0.1° C. 15 minutes later, the reaction mixture began to become milky. Even after the polymerization was continued for 20 hours, the milky dispersion was stable. It was confirmed by gas chromatography that the polymerization degree of the produced polymer reached 98%.

The thus obtained dispersion was cooled and was then centrifuged at 2000 rpm. As a result, the polymer particles completely settled and the supernatant solution was clear.

After removing the supernatant solution, 200 g of methanol was added to the settled polymer particles and the mixture was stirred for one hour to wash the polymer particles with the methanol. The mixture was again centrifuged and the settled polymer particles were washed with methanol in the same manner as mentioned above. Finally the polymer particles were washed with water and filtered through a 1 μm microfilter. The filtrate was clear and it was confirmed that the filtrate contained no polymer particles with a particle size of 1 μm or less.

The filtered polymer particles were air-dried at room temperature for 24 hours and were then dried at reduced pressure at 50° C. for 24 hours. As a result, polymer particles were obtained in the form of white powder, with a yield of 95%.

An observation of the polymer particles by an optical microscope indicated that each polymer particle was completely spherical and highly transparent.

Further, an observation of the polymer particles by a scanning electron microscope indicated that the average particle size was 3.2 μm and the particle size distribution was such that the amount of the polymer particles with particle sizes ranging from 2.4 μm to 4.0 μm was 98 wt. % (or vol. %) of the whole polymer particles.

EXAMPLE 2

In a 500 ml three-necked flask fitted with a stirrer and a reflux condenser was placed 320 g of methanol (dried through a molecular sieve 5A). To the methanol was added gradually, with stirring, 4.8 g of polyacrylic acid (M.W. 250,000), so that the polyacrylic acid was completely dissolved in the methanol. To this solution were added 1.0 g of methyltrioctylanmonium chloride and 1.0 g of hydrophobic colloidal silica. To this mixture were added 48 g of methylmethacrylate and 0.2 g of 2,2'-azobisisobutyronitrile. The flask was then purged with a dry argon gas, with stirring, and the reaction mixture was continuously stirred for one hour, with a small amount of the dry argon gas slowly passed therethrough.

Polymerization was initiated with stirring at 100 rpm. with the flask placed in a hot water bath thermostated at 60° C.±0.1° C. 20 minutes later, the reaction mixture began to become milky. 4.0 g of a tert-butanol solution containing 5 wt. % 2,2'-azobisisobutyronitrile was added two times at intervals of 2 hours. After the final addition of the butanol solution, the polymerization was continued for 8 hours. Then the polymerization was terminated and the reaction mixture was cooled.

An analysis by chromatography indicated that the polymerization degree of the produced polymer was 99.5% and the obtained dispersion was stable. No adhesion of the polymerized material to the blades of the stirrer and to the wall of the flask was observed. The dispersion passed through a 37 μm mesh filter and no residues were left on the filter.

The thus obtained dispersion was cooled and was then centrifuged at 2000 rpm as in Example 1. As a result, the polymer particles completely settled and the supernatant solution was clear. After removing the supernatant solution, the settled polymer particles were washed with methanol by centrifugation and with water in the same manner as in Example 1. Finally the polymer particles were washed with water and filtered through a 1 μm micro-filter. The filtrate was clear and it was confirmed that the filtrate contained no polymer particles with a particle size of 1 μm or less.

The filtered polymer particles were air-dried at room temperature for 24 hours and were then dried at reduced pressure at 50° C. for 24 hours. As a result, polymer particles of polymethacrylate were obtained in the form of white powder, with a yield of 97%.

An observation of the polymer particles by an optical microscope indicated that each polymer particle was completely spherical and highly transparent.

Further, an observation of the polymer particles by a scanning electron microscope indicated that the average particle size was 5.2 μm and the particle size distribution was such that the amount of polymer particles with particle sizes ranging from 3.9 μm to 16.5 μm was 98 wt. % (or vol. %) of the whole polymer particles.

EXAMPLE 3

In a 500 ml three-necked flask fitted with a stirrer and a reflux condenser were placed the following components:

tert-butanol (dried through the molecular sieve 5A): 330 g
Ethylene glycol: 5 g
Polyethylene oxide (M.W. 100,000): 10 g
Styrene - maleic anhydride copolymer: 6.75 g
Calcium phosphate: 1.5 g These components were dissolved with stirring. To this mixture were added 66 g of styrene and 0.8 g of lauroyl peroxide. The mixture was stirred and made homogenous. The flask was then purged with a dry argon gas, with stirring, and the reaction mixture was continuously stirred for one hour, with a small amount of the dry argon gas slowly passed therethrough.

Polymerization was initiated with stirring at 150 rpm. with the flask placed in a hot water bath thermostated at 60° C.±0.1° C. 20 minutes later, the reaction mixture began to become milky. Polymerization was continued for 15 hours. Even 15 hours after the polymerization, the milky dispersion remained stable. The polymerization degree of the produced polymer reached 97%. and the obtained dispersion was stable.

The thus obtained dispersion was cooled and was then centrifuged at 2000 rpm as in Example 1. As a result, the polymer particles completely settled and the supernatant solution was clear. After removing the supernatant solution, the settled polymer particles were washed with methanol by centrifugation and with water in the same manner as in Example 1. Finally the polymer particles were washed with water and filtered through a 1 μm micro-filter. The filtrate was clear and it was confirmed that the filtrate contained no polymer particles with a particle size of 1 μm or less.

The filtered polymer particles were air-dried at room temperature for 24 hours and were then dried at reduced pressure at 50° C. for 24 hours. As a result, polystrene beads were obtained with a yield of 97%.

An observation of the polystrene beads by an optical microscope indicated that each bead was completely spherical and highly transparent.

Further, an observation of the beads by a scanning electron microscope indicated that the average particle size was 12.3 μm and the particle size distribution was such that the amount of polymer particles with particle sizes ranging from 9.2 μm to 15.4 μm was 95 vol. % of the whole beads.

EXAMPLE 4

A methanol dispersion of polystyrene particles was prepared in the same manner as in Example 1. An observation of the polystyrene particles by a scanning electron microscope indicated that the average particle size was 3.5 μm and the particle size distribution was such that the amount of the polystrene particles with particle sizes ranging from 2.6 μm to 4.4 μm was 98 vol. % of the whole polystyrene particles.

180 g of the thus prepared methanol dispersion, 32 g of stryene, 160 g of methanol, 0.2 g of 2,2'-azobisisobutyronitrile and 2.5 g of hydrophobic colloidal silica were mixed and polymerization was performed for 20 hours.

The average particle size of the thus prepared polymer particles was 4.4 μm and the particle size distribution was such that the amount of the polymer particles with particle sizes ranging from 3.3 μm to 5.5 μm was 96 vol. % of the whole polymer particles. New formation of small polymer particles was not observed at all.

COMPARATIVE EXAMPLE 1

Example 1 was repeated except that 192 g of styrene and 3.2 g of polyvinyl pyrrolidone were employed, that is, the amount of styrene was 60 times that of polyvinyl pyrrolidone.

After polymerization, polymerized materials adhered to the wall of the flask and to the blades of the stirrer. In the dispersion, the amount of the polymer particles which did not pass through a 37 μm mesh filter was 75 g (46.9%) on dry basis. An observation of the dispersion which was passed through the 37 μm mesh filter by a scanning electron microscope indicated that a number of small polymer particles having particle sizes ranging from 0.5 μm to 1 μm were contained in the dispersion. When the dispersion was filtered through a 1 μm micron filter, the filtration was extremely slow and the filtrate was milky white.

COMPARATIVE EXAMPLE 2

Example 2 was repeated except that 288 g of styrene and 12 g of 2,2'-azobisisobutyronitrile were employed, that is, the amount of methylmethacrylate was 60 times that of polyacrylic acid acting as polymeric dispersion stabilizer.

30 minutes after heat application with stirring, the reaction mixture became milky white. One hour later, a condensate was formed, which became a lump of condensate and the dispersion was slightly milky.

EXAMPLE 5

In a 500 ml three-necked flask fitted with a stirrer and a reflux condenser was placed 320 g of methanol (dried through a molecular sieve 5A). To the methanol was added gradually, with stirring, 6.4 g of polyvinyl pyrrolidone (average M.W. 40,000), so that the polyvinyl pyrrolidone was completely dissolved in the methanol. To this solution, 28.8 g of styrene, 3.2 g of n-butylmethacrylate, 0.2 g of 2,2'-azobisisobutyronitrile were added and completely dissolved. The flask was purged with a dry argon gas, with stirring, and the reaction mixture was continuously stirred for one hour, with a small amount of the dry argon gas slowly passed therethrough.

Polymerization was initiated with stirring at 200 rpm. with the flask placed in a hot water bath thermostated at 60° C.±0.1° C. 15 minutes later, the reaction mixture began to become milky. After the polymerization for 20 hours, the milky dispersion was stable. It was confirmed by gas chromatography using ethylbenzene as internal standard that the polymerization degree of the produced polymer reached 98%.

The thus obtained dispersion was cooled and was then centrifuged at 2000 rpm. As a result, the polymer particles completely settled and the supernatant solution was clear. After removing the supernatant solution, 200 g of methanol was added to the settled polymer particles and the mixture was stirred for one hour to wash the polymer particles with the methanol. The mixture was again centrifuged and the settled polymer particles were washed with methanol in the same manner as mentioned above. Finally the polymer particles were washed with water and filtered through a 1 μm micro-filter. The filtrate was clear and it was confirmed that the filtrate contained no polymer particles with a particle size of 1 μm or less The filtered polymer particles were air-dried at room temperature for 24 hours and were then dried at reduced pressure at 50° C. for 24 hours. As a result, particles of a styrene - n-butylmethacrylate copolymer were obtained in the form of white powder, with a yield of 95%.

An observation of the polymer particles by an optical microscope indicated that each polymer particle was completely spherical and highly transparent.

Further, an observation of the polymer particles by a scanning electron microscope indicated that the average particle size was 4.8 μm and the particle size distribution was such that the amount of the polymer particles with particle sizes ranging from 3.6 μm to 6.0 μm was 98 wt. % (or vol. %) of the whole polymer particles.

EXAMPLES 6 THROUGH 10

Example 5 was repeated except that the solvent, polymeric dispersing agent, vinyl monomers and polymerization initiator were respectively replaced by those given in the following Table 1:

TABLE 1

| Example | Solvent | Dispersion Stabilizer | Vinyl Monomers | Initiator |
|---|---|---|---|---|
| 6 | Methanol (320 g) | Polyvinyl Pyrrolidone (6.4 g) | Styrene (25.6 g) n-BMA (6.4 g) | ABIN (0.20 g) |
| 7 | Ethanol (300 g) | Polyacrylic acid (9.0 g) | Styrene (25.6 g) n-BMA (6.4 g) | ABIN (0.20 g) |
| 8 | Methanol (300 g) Ethylene Glycol (20 g) | Styrene - Maleic Anhydride Copolymer (12.8 g) | Styrene (28.0 g) n-BMA (12.0 g) | ABIN (0.25 g) |
| 9 | Methanol (150 g) Ethanol (170 g) | Polyvinyl Pyrrolidone (12.8 g) | Styrene (28.0 g) n-BMA (12.0 g) | ABIN (0.25 g) |
| 10 | Methanol (280 g) Methylcellosolve (30 g) Diethylene Glycol (10 g) | Polyethyleneimine (9.0 g) | Styrene (31.5 g) n-BMA (13.5 g) | ABIN (0.30 g) |

The yields of the polymer particles obtained in Examples 6 through 10, the average particle sizes measured by use of a scanning electron microscope and the occupation ratios of the polymer particles within ? 25% of the particle size distribution were as in the following Table 2.

TABLE 2

| Example | Yield (wt. %) | Average Particle Size (μm) | Occupation Ratio in ±25% Range of Particle Size Distribution |
|---|---|---|---|
| 6 | 95 | 6.3 | 95 |
| 7 | 97 | 8.2 | 97 |
| 8 | 96 | 5.6 | 99 |
| 9 | 95 | 8.6 | 95 |
| 10 | 94 | 7.8 | 96 |

EXAMPLE 11

In a 500 ml three-necked flask fitted with a stirrer and a reflux condenser was placed 320 g of methanol (dried through a molecular sieve 5A). To the methanol was added gradually, with stirring, 4.8 g of polyacrylic acid (M.W. 50,000), so that the polyacrylic acid was completely dissolved in the methanol. To this solution were further added 1.0 g of methyltrioctylammonium chloride and 1.0 g of hydrophobic colloidal silica. 33.6 g of styrene, 7.2 g of n-butyl methacrylate, 7.2 g of 2-ethylhexyl acrylate and 0.2 g of 2,2'-azobisisobutyronitrile were then added to the above mixture. The flask was purged with a dry argon gas, with stirring, and the reaction mixture was continuously stirred for one hour, with a small amount of the dry argon gas slowly passed therethrough.

Polymerization was initiated with stirring at 100 rpm. with the flask placed in a hot water bath thermostated at 60° C.±0.1° C. 20 minutes later, the reaction mixture began to become milky. 4.0 g of a tert-butanol solution containing 5 wt. % of 2,2'-azobisisobutyronitrile was added two times at intervals of 2 hours. After the final addition of the butanol solution, the polymerization was continued for 8 hours. The polymerization was then terminated and the reaction mixture was cooled. An analysis by chromatography indicated that the polymerization degree of the produced polymer was 99.5% and the obtained dispersion was stable. No adhesion of the polymerized material to the blades of the stirrer and to the wall of the flask was observed. The dispersion entirely passed through a 37 μm mesh filter and no residues were left on the filter.

The thus obtained dispersion was cooled and was then centrifuged at 2000 rpm as in Example 5. As a result, the polymer particles completely settled and the supernatant solution was clear. After removing the supernatant solution, the settled polymer particles were washed with methanol by centrifugation and with water in the same manner as in Example 5. Finally the polymer particles were washed with water and filtered through a 1 μm micro-filter. The filtrate was clear and it was confirmed that the filtrate contained on polymer particles with a particle size of 1 μm or less.

The filtered polymer particles were air-dried at room temperature for 24 hours and were then dried at reduced pressure at 50° C. for 24 hours. As a result, polymer particles of a styrene/n-butylmethacrylate/2-ethylhexyl methacrylate copolymer with a three-dimentional structure were obtained in the form of white powder, with a yield of 97%.

An observation of the polymer particles by an optical microscope indicated that each polymer particle was completely spherical and highly transparent.

Further, an observation of the polymer particles by a scanning electron microscope indicated that the average particle size was 8.0 μm and the particle size distribution was such that the amount of polymer particles with particle sizes ranging from 6.0 μm to 10.0 μm was 98 vol. % of the whole polymer particles.

EXAMPLE 12

In a 500 ml three-necked flask fitted with a stirrer and a reflux condenser were placed 345 g of methanol (dried through the molecular sieve 5A) and 5 g of ethylene glycol.

To this mixture, 10 g of polyethylene oxide (M.W. 100,000) and 7.5 g of styrene - maleic anhydride copolymer were gradually added with stirring, so that these components were completely dissolved.

To this mixture were added 42 g of styrene, 28 g of n-butyl methacrylate, 0.8 g of lauroyl peroxide and 1.5 g of calcium phosphate. The flask was then purged with a dry argon gas, with stirring, and the reaction mixture was stirred for one hour, with a small amount of the dry argon gas slowly passed therethrough.

Polymerization was initiated with stirring at 100 rpm, with the flask placed in a hot water bath thermostated at 60° C.±0.1° C. 20 minutes later, the reaction mixture began to become milky. Polymerization was continued for 5 hours. 0. 4 g of lauroyl peroxide was added to the reaction mixture and polymerization was further continued for 5 hours. Even after the 5-hour polymerization, the milky dispersion remained stable. The polymerization degree of the produced polymer reached 98%.

An observation of the polymer particles by an optical microscope indicated that each particle was completely spherical and highly transparent, and an observation of the particles by a scanning electron microscope indicated that the average particle size was 7.6 μm and the particle size distribution was such that the amount of polymer particles with particle sizes ranging from 5.7 μm to 9.5 μμm was 97 vol. % of the whole particles.

In a 300 ml three-necked flask fitted with a stirrer and a reflux condenser were placed the following components:

Dispersion obtained above: 180 g
Styrene: 28 g
Methanol: 160 g
2,2'-azobisisobutyronitrile: 0.2 g
Hyrophobic colloidal silica: 2.8 g The above reaction mixture was mixed and polymerization was initiated with stirring at 100 rpm, with the flask placed in a hot water bath thermostated at 60° C.±0.1° C. Thus polymerization was continued for 20 hours.

The average particle size of the thus prepared polymer particles was 9.5 μm and the particle size distribution was such that the amount of the polymer particles with particle sizes ranging from 7.1 μm to 11.9 μm was 96 vol. % of the whole polymer particles. New formation of small polymer particles was scarcely observed. An analysis of the dispersion by use of Coulter counter indicated that the number of particles having particle sizes of 5 μm or less did not change.

By washing, filtering and drying the produced polymer particles in the same manner as described in Example 1, 54.0 g of polymer particles was obtained in the form of white powder.

What is claimed is:

1. A method of producing polymer particles having a particle size distribution of ±25% with respect to each average particle size in an amount of 95 wt. % or more, within the average particle sizes ranging from 1 μm to 100 μm, comprising the steps of:

(1) adding polymeric dispersion stabilizer in an amount of 0.1 to 10 wt. % to a hydrophilic organic liquid in which said polymeric dispersion stabilizer is soluble;

(2) adding thereto at least one vinyl monomer in an amount of said polymeric dispersion stabilizer so that a minimum amount of at least 5 wt. % of said polymeric dispersion stabilizer relative to the amount of vinyl monomer is present, which monomer is soluble in said hydrophilic organic liquid, but when polymerized, said polymer is swellable or is substantially insoluble in said hydrophilic organic liquid wherein said polymeric dispersion stabilizer is selected from the group consisting of homopolymers and copolymers of vinylpyridine, vinylpyrrolidone, N-vinylimidazole and ethyleneimine; and (3) polymerizing said monomer under the condition that the amount of said vinyl monomer is 200 wt. % or less of said hydrophilic organic liquid, wherein said hydrophilic organic liquid is selected from the group consisting of methyl alcohol, ethyl alcohol, modified ethyl alcohol, isopropyl alcohol, n-butyl alcohol, isobutyl alcohol, tert-butyl alcohol, sec-butyl alcohol, tert-amyl alcohol, 3-pentanol, octyl alcohol benzyl alcohol, cyclohexanol, furfuryl alcohol, tetrahydrofurfuryl alcohol, ethylene glycol, glycerol and diethylene glycol.

* * * * *

UNITED STATES PATENT AND TRADEMARK OFFICE
CERTIFICATE OF CORRECTION

PATENT NO. : 4,885,350

DATED : December 5, 1989

INVENTOR(S) : Yamashita et al

It is certified that error appears in the above-identified patent and that said Letters Patent is hereby corrected as shown below:

Column 4, line 17, delete "diethy" and insert --diethyl--.

Column 12, line 20, add --.-- after "less".

Column 13, line 4, delete "?" and insert --±--, line 23, delete "(M.W. 50,000)" and insert --(M.W. 250,000)--.

Column 14, line 44, delete "9.5 µµm" and insert --9.5 µm--, line 52, delete "hyrophobic" and insert --hydrophobic--.

Signed and Sealed this

Thirteenth Day of August, 1991

Attest:

HARRY F. MANBECK, JR.

Attesting Officer

Commissioner of Patents and Trademarks